United States Patent
Nagarajan et al.

(10) Patent No.: US 11,181,365 B2
(45) Date of Patent: Nov. 23, 2021

(54) SYSTEMS AND METHODS FOR DETERMINING WHICH REFERENCE-LEVEL PRESSURES ARE USED WHEN ESTIMATING AN ALTITUDE OF A MOBILE DEVICE

(71) Applicant: NextNav, LLC, Sunnyvale, CA (US)

(72) Inventors: Badrinath Nagarajan, Cupertino, CA (US); Guiyuan Han, San Jose, CA (US); Michael Dormody, San Jose, CA (US)

(73) Assignee: NextNav, LLC, Sunnyvale, CA (US)

( * ) Notice: Subject to any disclaimer, the term of this patent is extended or adjusted under 35 U.S.C. 154(b) by 328 days.

(21) Appl. No.: 16/364,741

(22) Filed: Mar. 26, 2019

(65) Prior Publication Data

US 2019/0368872 A1    Dec. 5, 2019

Related U.S. Application Data

(60) Provisional application No. 62/680,059, filed on Jun. 4, 2018.

(51) Int. Cl.
*G01C 5/06* (2006.01)
*G01W 1/16* (2006.01)
*G01L 7/00* (2006.01)

(52) U.S. Cl.
CPC ............ *G01C 5/06* (2013.01); *G01L 7/00* (2013.01); *G01W 1/16* (2013.01)

(58) Field of Classification Search
CPC ... G01C 5/06; G01W 1/16; G01L 7/00; G01S 19/14
See application file for complete search history.

(56) References Cited

U.S. PATENT DOCUMENTS 8,130,141 B2   3/2012   Pattabiraman et al.
9,057,606 B2   6/2015   Wolf et al.
(Continued)

OTHER PUBLICATIONS

Moffat et al., "Comprehensive comparison of gap-filling techniques for eddy covariance net carbon fluxes", Agricultural and Forest Meteorology, vol. 147, Issues 3-4, Dec. 10, 2007, pp. 209-232.
(Continued)

*Primary Examiner* — Mohammad K Islam
(74) *Attorney, Agent, or Firm* — MLO, a professional corp.

(57) ABSTRACT

Determining which reference-level pressures, from among a plurality of available reference-level pressures, are used when estimating an altitude of a mobile device. Different systems and methods determine isobars based on reference-level pressures of weather stations, and then use the isobars in different ways to identify particular reference-level pressures for use in estimated an altitude of a mobile device. One approach determines the smallest distance between an initial estimated position of a mobile device and a neighboring isobar, and then uses that distance to identify reference-level pressures. Another approach identifies reference-level pressures between an isobar on which an initial estimated position of a mobile device is location and a neighboring isobar. Yet another approach compares the number of identified reference-level pressures and/or locations of the identified reference-level pressures against threshold conditions before determining which reference-level pressures to use.

14 Claims, 13 Drawing Sheets

(56) References Cited

U.S. PATENT DOCUMENTS

| | | | |
|---|---|---|---|
| 9,980,246 B2 | 5/2018 | Pattabiraman et al. | |
| 10,477,358 B1 | 11/2019 | Dormody | |
| 2013/0133421 A1* | 5/2013 | Katz | G01C 5/06 73/490 |
| 2014/0278182 A1* | 9/2014 | Garcia | G01C 5/06 702/95 |
| 2015/0332490 A1* | 11/2015 | Coulmeau | G06T 11/206 701/3 |
| 2016/0198431 A1* | 7/2016 | Pattabiraman | H04W 64/003 455/414.2 |
| 2017/0280301 A1 | 9/2017 | Chang et al. | |
| 2019/0360804 A1 | 11/2019 | Dormody | |
| 2019/0360886 A1 | 11/2019 | Dormody | |
| 2019/0364385 A1 | 11/2019 | Dormody | |
| 2019/0368870 A1 | 12/2019 | Nagarajan | |
| 2019/0368873 A1 | 12/2019 | Dormody | |

OTHER PUBLICATIONS

Sankaran et al., "Using Mobile Phone Barometer for Low-Power Transportation Context Detection", SenSys '14 Proceedings of the 12th ACM Conference on Embedded Network Sensor Systems, Nov. 3-6, 2014, pp. 191-205.

Henn et al., "A Comparison of Methods for Filling Gaps in Hourly Near-Surface Air Temperature Data", Journal of Hydometeorology, American Meteorological Society, vol. 14, Jun. 2013, pp. 929-945.

Ghaderi et al., "Deep Forecast: Deep Learning-based Spatio-Temporal Forecasting", ICML 2017 Time Series Workshop, Sydney, Australia, 2017, 6 pages.

Germann et al., "Scale-Dependence of the Predictability of Precipitation from Continental Radar Images. Part I: Description of the Methodology", American Meteorological Society, Monthly Weather Review, vol. 130, Dec. 2002, pp. 2859-2873.

\* cited by examiner

Determining which reference-level pressures are used when estimating an altitude of a mobile device

↓

Perform steps 210 through 240 of FIG. 2

↓

*Using the plurality of isobars to estimate the altitude of the mobile device*

Identify each weather station that is located between the first isobar and a second isobar that neighbors the first isobar (step 450)

Determine that a point on the second isobar is closer to the initial estimated position than any other point on any isobar from the plurality of isobars other than the first isobar (e.g., sub-step 450a)

↓

Select the second isobar because the point on the second isobar is closer to the initial estimated position than any other point on any isobar from the plurality of isobars other than the first isobar (e.g., sub-step 450b)

↓

Identify each weather station that is located between the first isobar and the second isobar (e.g., sub-step 450c)

↓

Identify each reference-level pressure for each identified weather station (step 460)

↓

Use the identified reference-level pressures to estimate the altitude of the mobile device (step 470)

SYSTEMS AND METHODS FOR DETERMINING WHICH REFERENCE-LEVEL PRESSURES ARE USED WHEN ESTIMATING AN ALTITUDE OF A MOBILE DEVICE

TECHNICAL FIELD

Aspects of this disclosure generally pertain to positioning of mobile devices.

BACKGROUND

Determining the exact location of a mobile device (e.g., a smart phone operated by a user) in an environment can be quite challenging, especially when the mobile device is located in an urban environment or is located within a building. Imprecise estimates of the mobile device's altitude, for example, may have life or death consequences for the user of the mobile device since the imprecise altitude estimate can delay emergency personnel response times as they search for the user on multiple floors of a building. In less dire situations, imprecise altitude estimates can lead a user to the wrong area in an environment.

Different approaches exist for estimating an altitude of a mobile device. In a barometric-based positioning system, altitude can be computed using a measurement of pressure from a calibrated pressure sensor of a mobile device along with ambient pressure measurement(s) from a network of calibrated reference pressure sensors and a measurement of ambient temperature from the network or other source. An estimate of an altitude of a mobile device ($h_{mobile}$) can be computed by the mobile device, a server, or another machine that receives needed information as follows:

$$h_{mobile} = h_{sensor} - \frac{RT_{remote}}{gM} \ln\left(\frac{P_{sensor}}{P_{mobile}}\right), \quad \text{(Equation 1)}$$

where $P_{mobile}$ is the estimate of pressure at the location of the mobile device by a pressure sensor of the mobile device, $P_{sensor}$ is an estimate of pressure at the location of a reference pressure sensor that is accurate to within a tolerated amount of pressure from true pressure (e.g., less than 5 Pa), $T_{remote}$ is an estimate of temperature (e.g., in Kelvin) at the location of the reference pressure sensor or a different location of a remote temperature sensor, $h_{sensor}$ is an estimated altitude of the reference pressure sensor that is estimated to within a desired amount of altitude error (e.g., less than 1.0 meters), g corresponds to the acceleration due to gravity, R is a gas constant, and M is molar mass of air (e.g., dry air or other). The minus sign (−) may be substituted with a plus sign (+) in alternative embodiments of Equation 1, as would be understood by one of ordinary skill in the art. The estimate of pressure at the location of the reference pressure sensor can be converted to an estimated reference-level pressure that corresponds to the reference pressure sensor in that it specifies an estimate of pressure at the latitude and longitude of the reference pressure sensor, but at a reference-level altitude that likely differs from the altitude of the reference pressure sensor. The reference-level pressure can be determined as follows:

$$P_{ref} = P_{sensor} \times \exp\left(-\frac{gM(h_{ref} - h_{sensor})}{RT_{remote}}\right), \quad \text{(Equation 2)}$$

where $P_{sensor}$ is the estimate of pressure at the location of the reference pressure sensor, $P_{ref}$ is the reference-level pressure estimate, and $h_{ref}$ is the reference-level altitude. The altitude of the mobile device $h_{mobile}$ can be computed using Equation 1, where $h_{ref}$ is substituted for $h_{sensor}$ and $P_{ref}$ is substituted for $P_{sensor}$. The reference-level altitude $h_{ref}$ may be any altitude and is often set at mean sea-level (MSL). When two or more reference-level pressure estimates are available, the reference-level pressure estimates are combined into a single reference-level pressure estimate value (e.g., using an average, weighted average, or other suitable combination of the reference pressures), and the single reference-level pressure estimate value is used for the reference-level pressure estimate $P_{ref}$.

One factor that often affects the accuracy of an estimated altitude is the proximity of the weather station to the mobile device. Reference-level pressures for weather stations found within a predefined distance (e.g., a chosen radius such as 6 km) can be averaged to yield a more-accurate estimated altitude than when additional reference-level pressures found within a larger predefined distance (e.g., a chosen radius such as 12 km) are also used. Predefined distances will vary as a function of pressure patterns associated with weather conditions at different times and/or in different environments. In some cases, no suitable reference-level pressures will be found within a predefined distance, so another approach for identifying reference-level pressures must be used other than proximity Different ways of determining which reference-level pressures to use when estimating an altitude of a mobile device depending on the position of the mobile device in an environment and/or pressure patterns of that environment are described herein.

BRIEF DESCRIPTION OF THE DRAWINGS

FIG. 4 depicts another process for determining which reference-level pressures, from among a plurality of available reference-level pressures, are used when estimating an altitude of a mobile device.

DETAILED DESCRIPTION

Approaches for selecting which reference-level pressures, from among a plurality of available reference-level pressures, are used when estimating an altitude of a mobile device are described herein. Selection of reference-level pressures can be achieved using a pressure map based on a horizontal pressure gradient, and also a tolerated pressure difference corresponding to a tolerated altitude error (e.g., a tolerated pressure difference of 10 Pa corresponds to 1 meter of tolerated altitude error).

One method computes a dynamically-changing radius that is used to select reference-level pressures of weather stations that are near a mobile device. The dynamically-changing radius accounts for conditions ranging from calm to disturbed weather. Each radius can be computed as the shortest distance between (i) an initial estimated position (e.g., latitude and longitude) on a first isobar in the map and (ii) a second isobar, where the first and second isobars are separated by the tolerated pressure difference. The reference-level pressures for all weather stations within the radius can then be selected for use in estimating the altitude of the mobile device because those selected reference-level pressures are expected to always be within the tolerated pressure difference from an unknown reference-level pressure corresponding to the initial estimated position.

Another method selects reference-level pressures of weather stations based on pressure conditions that are similar to pressure conditions experienced by a mobile device. Each reference-level pressure between (i) a first isobar on which an initial estimated position of the mobile device is located and (ii) a second isobar, where the first and second isobars are separated by the tolerated pressure difference, can be selected for use in estimating the altitude of the mobile device because those selected reference-level pressures are expected to always be within the tolerated pressure difference from an unknown reference-level pressure corresponding to the initial estimated position.

Figure 1:
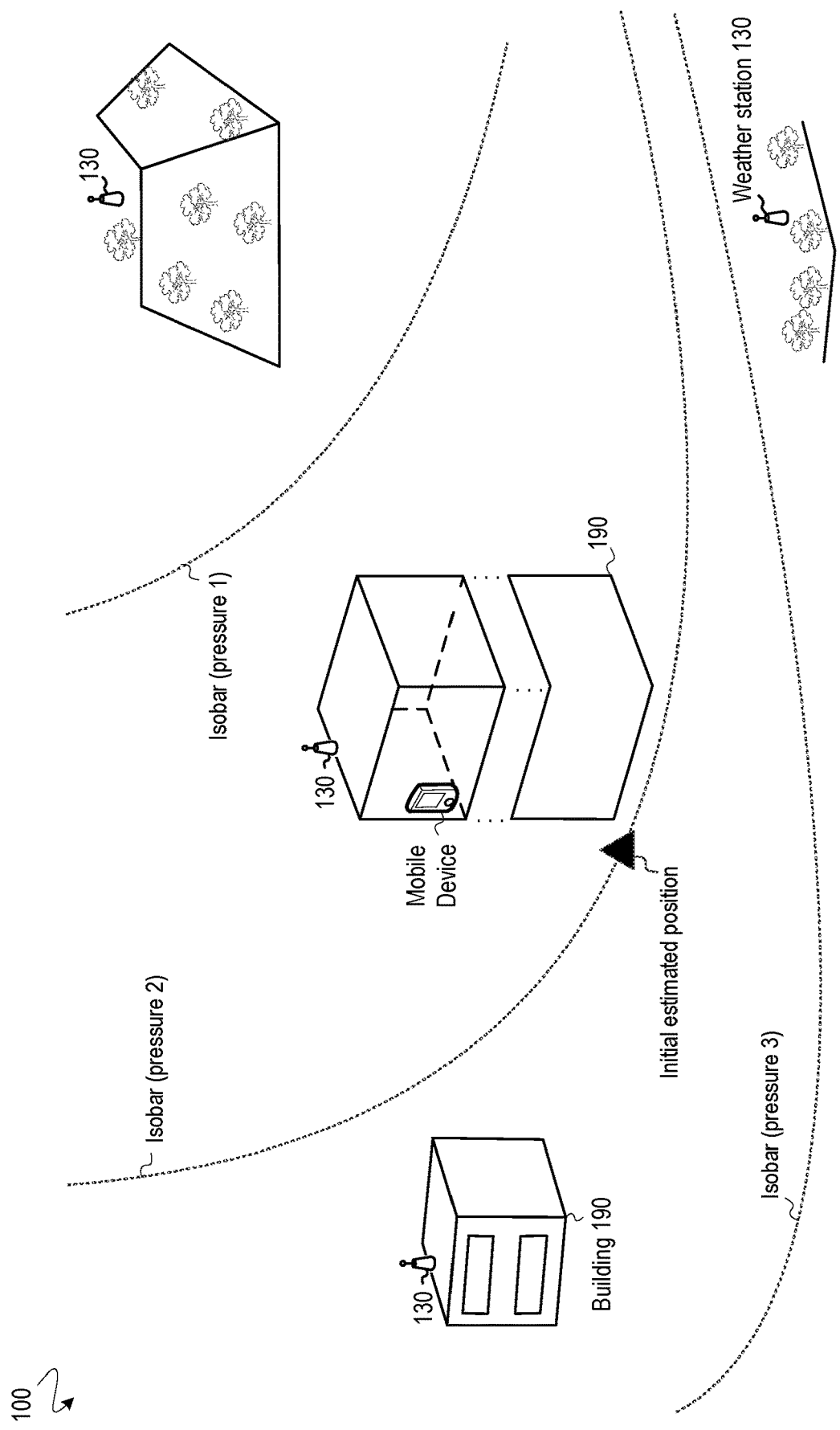
FIG. 1 depicts an operational environment in which reference-level pressures are selected for use when estimating an altitude of a mobile device.

Attention is now drawn to FIG. 1, depicts an operational environment in which reference-level pressures are selected for use when estimating an altitude of a mobile device. As shown, the environment 100 includes different weather stations 130 at different locations. Each weather station 130 measures a pressure using a pressure sensor and optionally measures a temperature using a temperature sensor. Each measured pressure can be converted to a reference-level pressure for a reference-level altitude (e.g., a mean sea level altitude) using previously-described Equation 2. In one embodiment, a reference-level pressure is determined using a processor or other suitable machine of the weather station 130. In another embodiment, a reference-level pressure is determined by a server or other suitable machine that obtains measured pressures from a weather station 130. Each weather station 130 transmits pressure data (e.g., reference-level pressures computed by the weather station, or measured pressures if reference-level pressures are computed at a mobile device, a server or elsewhere) from its location to another location. For example, transmission may be made to a mobile device and/or a server for use in determining an estimated altitude of the mobile device. Transmission from a particular weather station 130 may be made by any known means, including (i) transmission via a transmitter that includes or is co-located with the weather station 130, or (ii) any suitable technique for transmitting data from the weather station 130 to another thing (e.g., a mobile device or a server).

In FIG. 1, isobars representing particular values of pressure data (e.g., reference-level pressures) are determined. For example, a spatial distribution of reference-level pressures is converted to a gridded field (e.g., using a Kriging method), and isobars are generated between a minimum and maximum of the reference-level pressure in increments of a tolerated pressure difference that corresponds to a tolerated altitude error (e.g., 6 Pa for less than 1 meter of altitude error). Any known approach may be used to generated isobars based on the gridded field. One isobar intersects an initial estimate of the mobile device. Once a pressure pattern (e.g., represented by isobars) is determined for an environment, different approaches can be employed to select which reference-level pressures are used when estimating an altitude of a mobile device. Such approaches are described below with reference to FIG. 2, FIG. 4, FIG. 6A, FIG. 6B and FIG. 6C.

Figure 2:
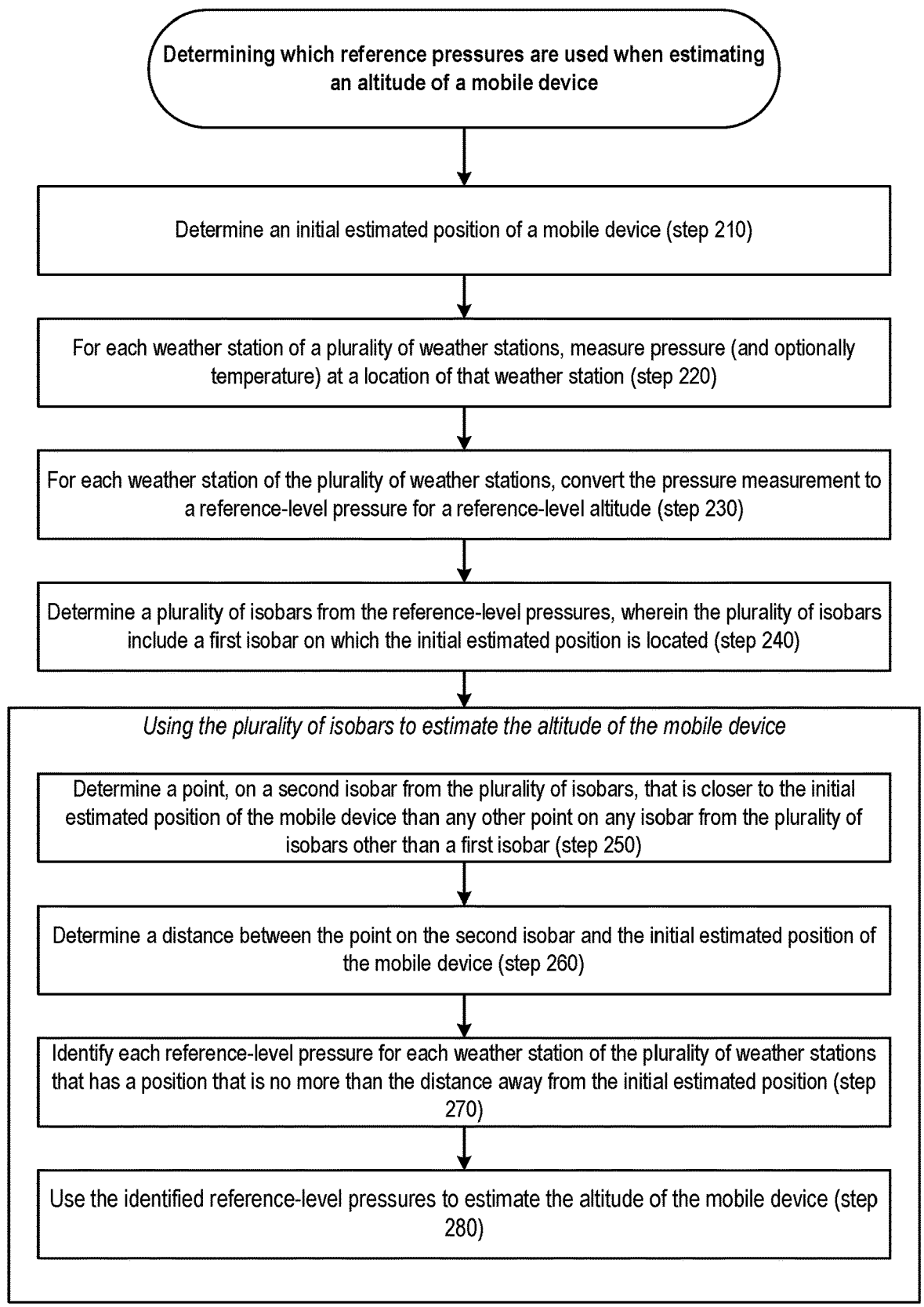
FIG. 2 depicts a process for determining which reference-level pressures, from among a plurality of available reference-level pressures, are used when estimating an altitude of a mobile device.

FIG. 2 depicts a process for determining which reference-level pressures, from among a plurality of available reference-level pressures, are used when estimating an altitude of a mobile device. The steps of the process depicted in FIG. 2 are described below.

An initial estimated position of a mobile device is determined (step 210). The initial estimate can be determined using known approaches and machines, such as GNSS positioning with GNSS signals from GNSS satellites, terrestrial positioning with positioning signals from terrestrial transmitters, Wi-Fi positioning with signal(s) from a Wi-Fi beacon(s), or other positioning techniques. In different embodiments, the initial estimated position is determined using a processor of the mobile device, a server, or other suitable machine.

A measurement of a pressure (and optionally a measurement of temperature) is determined by a pressure sensor at each location of each weather station from a plurality of weather stations (step 220). In different embodiments, the plurality of weather stations consists of all weather stations in a network of weather stations, all weather stations within a predefined distance from the initial estimated position, or all weather stations within a defined area in which the mobile device is located.

Each measurement of pressure is converted to a reference-level pressure for a reference-level altitude (step 230). In different embodiments, the conversion is determined using a processor of the weather station (or a transmitter that includes or is co-located with the weather station), a mobile device, a server, or another suitable machine. By way of example, the following formula may be used to convert the measurement of the pressure to the reference-level pressure for the reference-level altitude:

$$P_{ref} = P_{sensor} \exp\left(-\frac{gM(h_{ref} - h_{sensor})}{RT_{remote}}\right), \quad \text{(Equation 3)}$$

where $P_{ref}$ is the reference level pressure, $P_{sensor}$ is the measurement of pressure at the location of the weather station, $h_{ref}$ is the reference-level altitude, $h_{sensor}$ is the altitude of the weather station, $T_{remote}$ is an accurate estimate of temperature (e.g., in Kelvin) at the location of the weather station or a different location of a remote temperature sensor, g corresponds to the acceleration due to gravity, R is a gas constant, and M is molar mass of air (e.g., dry air or other). The reference-level altitude, $h_{ref}$ may be any altitude and is often set at sea-level.

A plurality of isobars are determined from the reference-level pressures (step 240), where each isobar represents a different pressure value, and a first isobar from the plurality of isobars passes through the initial estimated position of the mobile device. Any known approach for determining isobars based on the reference-level pressures can be used. In different embodiments, the isobars are determined using a processor of the mobile device, a server, or another suitable machine. In some embodiments, each isobar is represented by a line on a two-dimensional or three-dimensional map that is determined by connecting points in the map at which the same atmospheric pressure is known or believed to exist. In one embodiment, each pair of neighboring isobars from the plurality of isobars are separated by no more than a predefined amount of pressure, where spacing between different neighboring isobars may differ. In another embodiment, each pair of neighboring isobars from the plurality of isobars are separated by exactly the predefined amount of pressure. The predefined amount of pressure is selected based on a tolerated altitude error, where 1 meter of altitude error typically corresponds to 10 Pa of pressure (e.g., 10 Pa, 20 Pa, or 30 Pa respectively correspond to 1 m, 2 m, or 3 m of tolerated altitude error). By way of example, a predefined amount of pressure equal to 30 Pa is selected for 3 meters of tolerated altitude error, where the amount of tolerated altitude error corresponds to a maximum amount of error tolerated for an estimate of a mobile device's altitude.

In an alternative embodiment of step 240, only two or three isobars are determined, including a first isobar representing a first pressure value and that passes through the initial estimated position, a second isobar representing a second pressure value that differs from the first isobar by a predefined amount of pressure, and (if it exists) a third isobar representing a third pressure value that differs from the first isobar by the predefined amount of pressure. One advantage of this alternative embodiment is reduced computation in having to determine less isobars compared to the other embodiment of steep 240 that computes all available isobars.

A sub-process is performed to find a point on a second isobar (e.g., by way of a search), where the point is closer to the initial estimated position than any other point on any isobar from the plurality of isobars other than the first isobar (step 250). A distance between the point on the second isobar and the initial estimated position of the mobile device is determined (step 260). The distance determined during step 260 is used to identify each reference-level pressure for each weather station having a position that is within the distance from the initial estimated position (step 270). Each position may take different forms in different embodiments, including two-dimensional positions (e.g., latitude and longitude) or three-dimensional positions (latitude, longitude and altitude) of the weather station positions and the mobile device's initial estimated position. In different embodiments, each of the sub-process, determined distance, and identification of pressures is carried out using a processor of the mobile device, a server, or another suitable machine.

Each of the reference-level pressures identified during step 270 are used to estimate the altitude of the mobile device (step 280). In different embodiments, altitude is estimated using a processor of the mobile device, a server, or another suitable machine. One embodiment of step 280 comprises combining the identified reference-level pressures (e.g., using an average, weighted average, or other suitable combination of the reference-level pressures), and then estimating the altitude of the mobile device as follows:

$$h_{mobile} = h_{ref} - \frac{RT_{remote}}{gM} \ln\left(\frac{P_{ref}}{P_{mobile}}\right), \quad \text{(Equation 4)}$$

where $h_{mobile}$ is the estimated altitude of the mobile device, $P_{mobile}$ is an estimate of pressure at the location of the mobile device from a pressure sensor of the mobile device, $P_{ref}$ is the combination of the identified reference-level pressures from weather stations, $T_{remote}$ is an estimate of temperature (e.g., in Kelvin) at a location of a temperature sensor in the environment or a combination of temperatures from the weather stations, $h_{ref}$ is the reference-level altitude, g corresponds to the acceleration due to gravity, R is a gas constant, and M is molar mass of air (e.g., dry air or other).

Step 250 through step 280 provide one embodiment for using a plurality of isobars to estimate the altitude of the mobile device.

The process of FIG. 2 advantageously selects reference-level pressures based on different weather conditions. Under calm conditions, isobars are spaced further apart yielding a larger distance and more reference-level pressures, while disturbed weather conditions yield a smaller distance and less reference-level pressures to account for tighter spacing of pressure isobars caused by the disturbed weather conditions.

By way of example, FIG. 3A through FIG. 3F show a mapped environment at different steps of the process of FIG. 2.

Figure 3A:
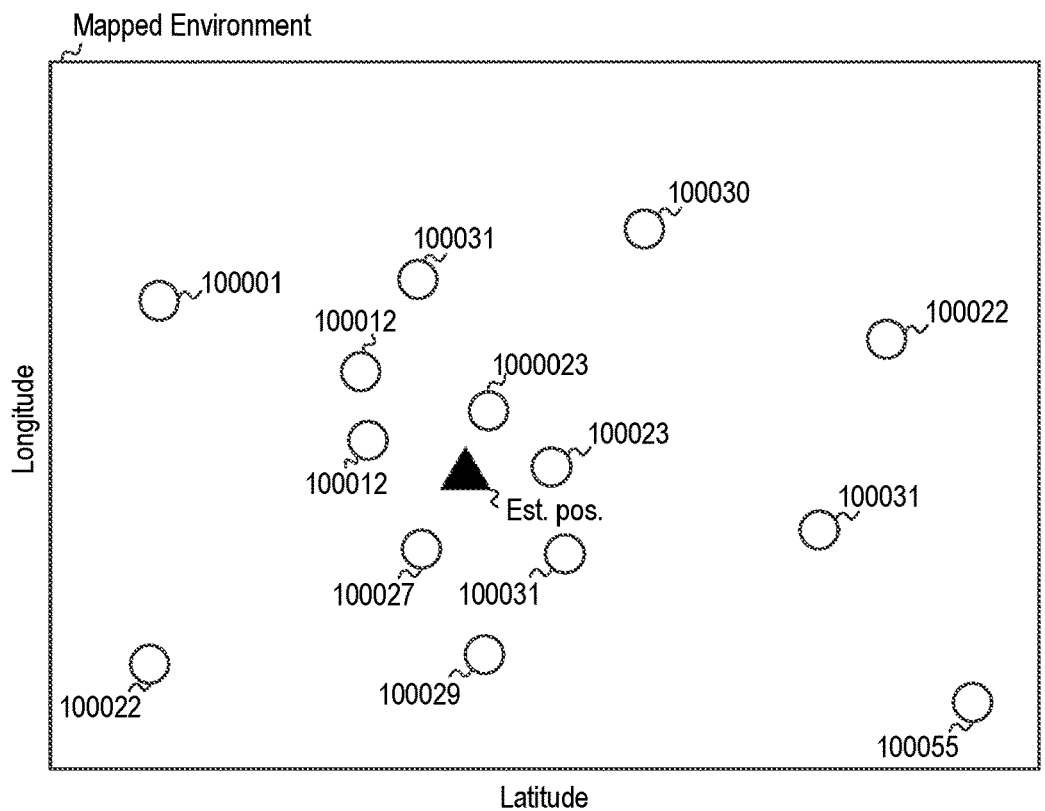
FIG. 3A through FIG. 3F show a mapped environment at different steps of the process of FIG. 2.
Figure 3B:
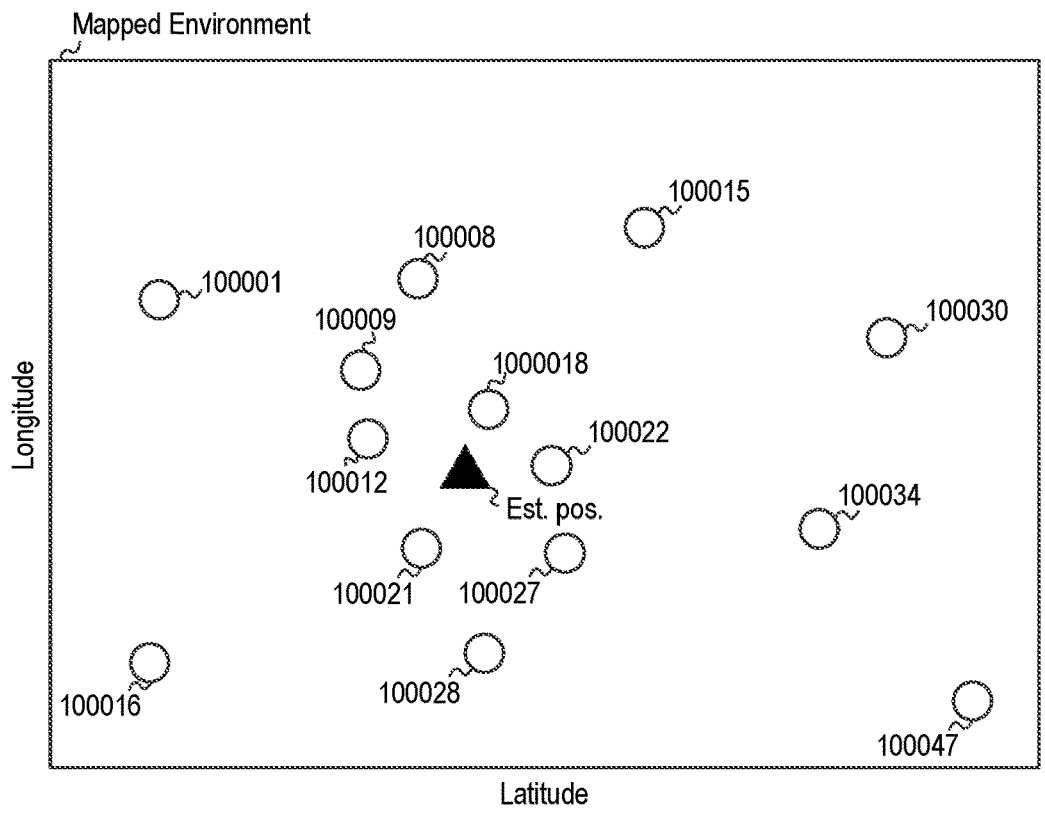
Figure 3C:
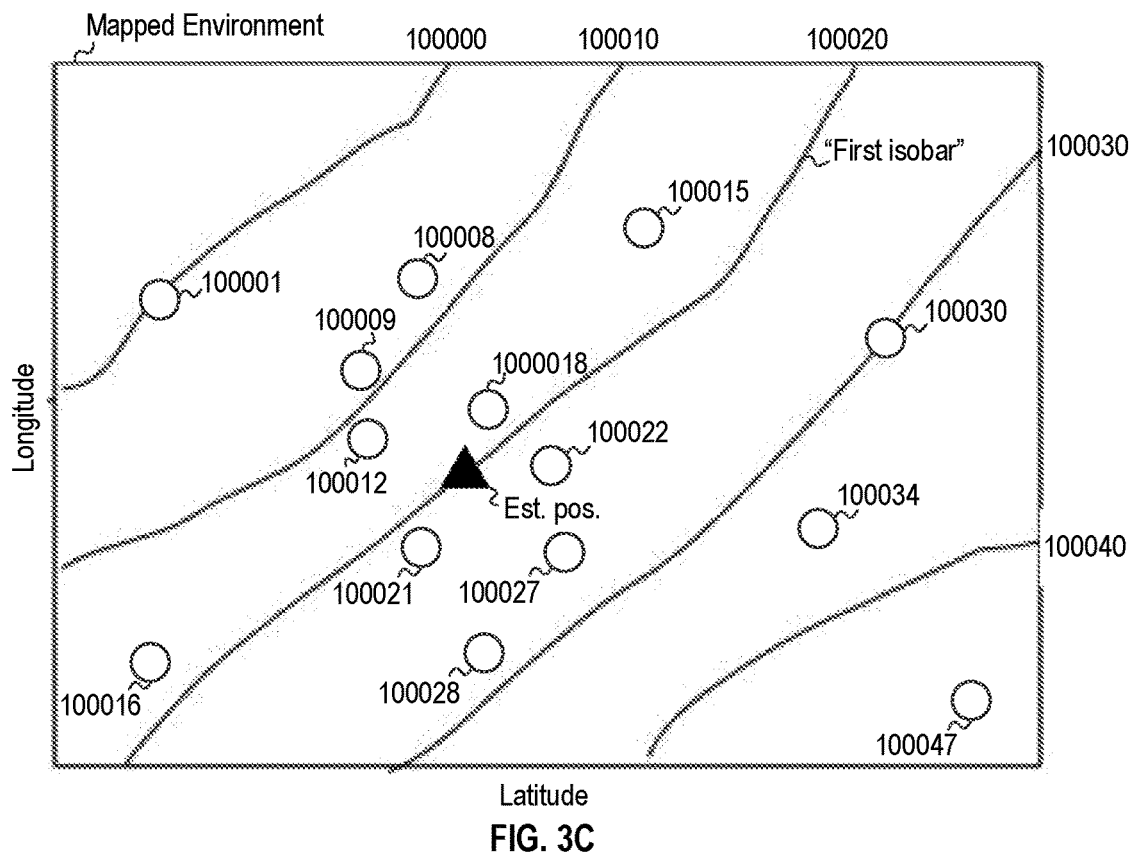
Figure 3D:
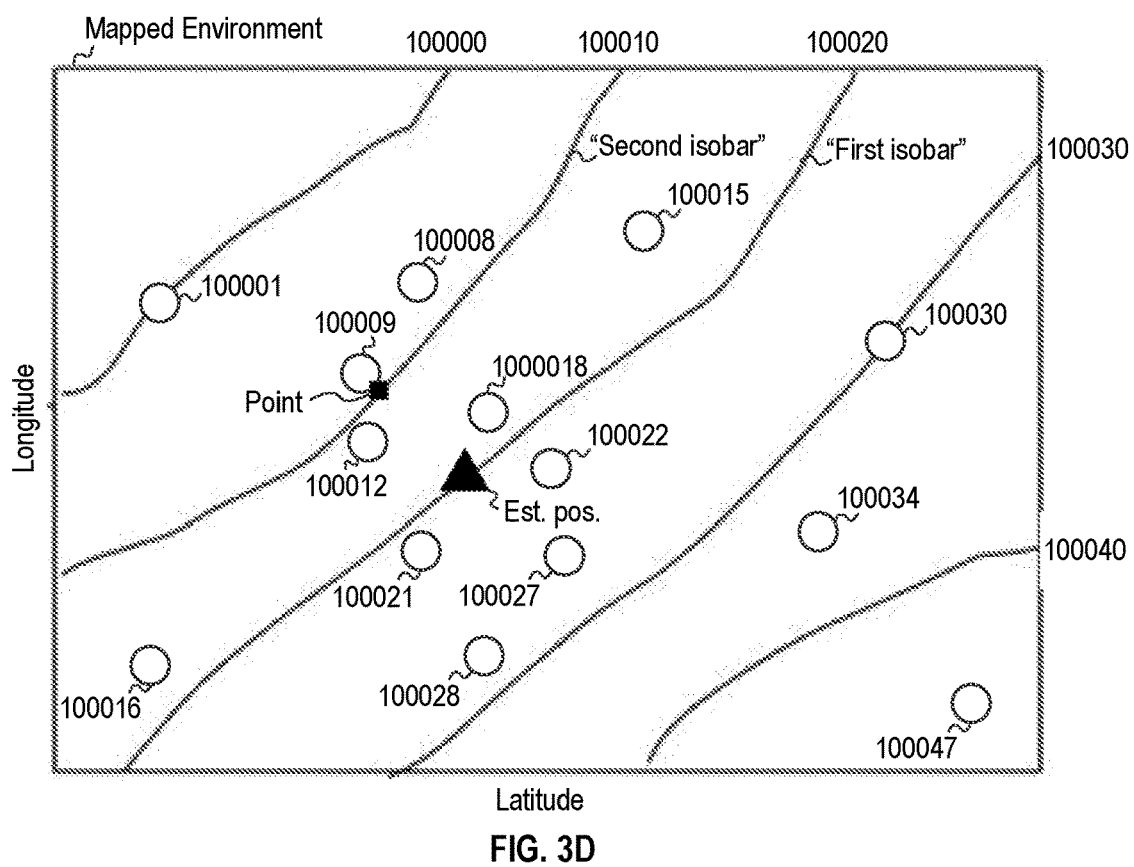
Figure 3E:
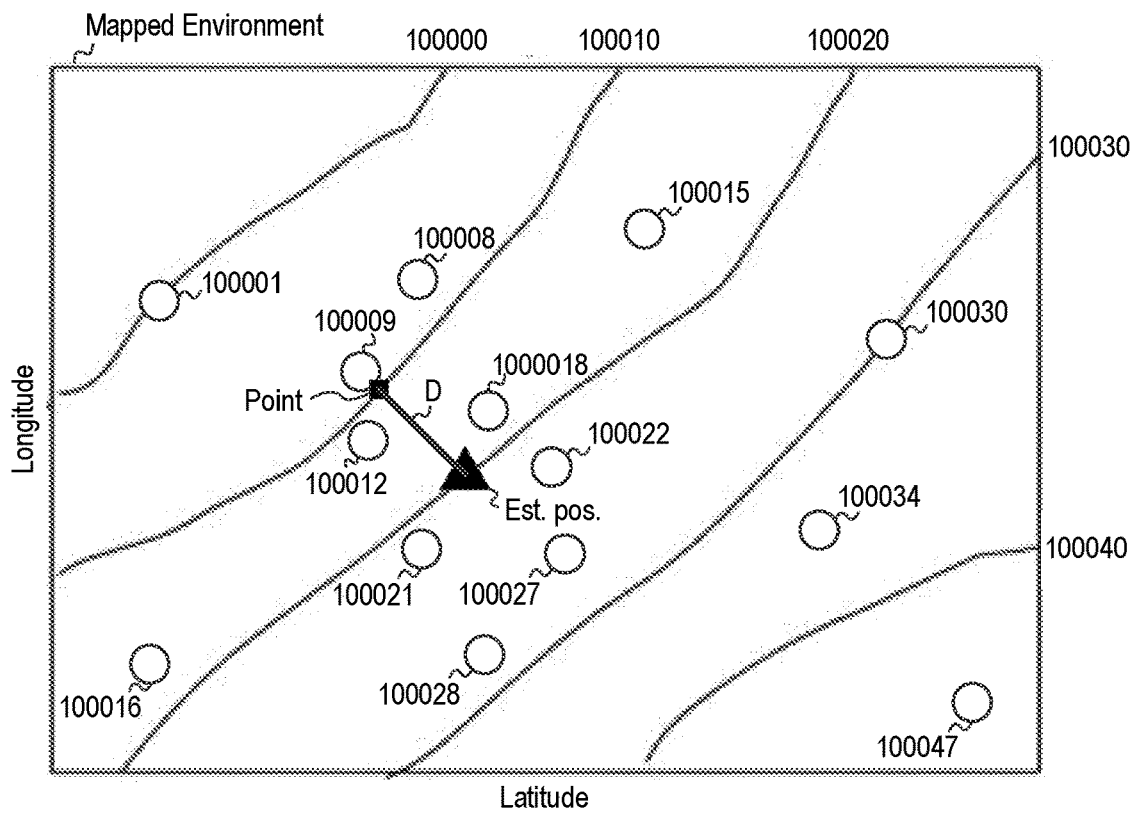
Figure 3F:
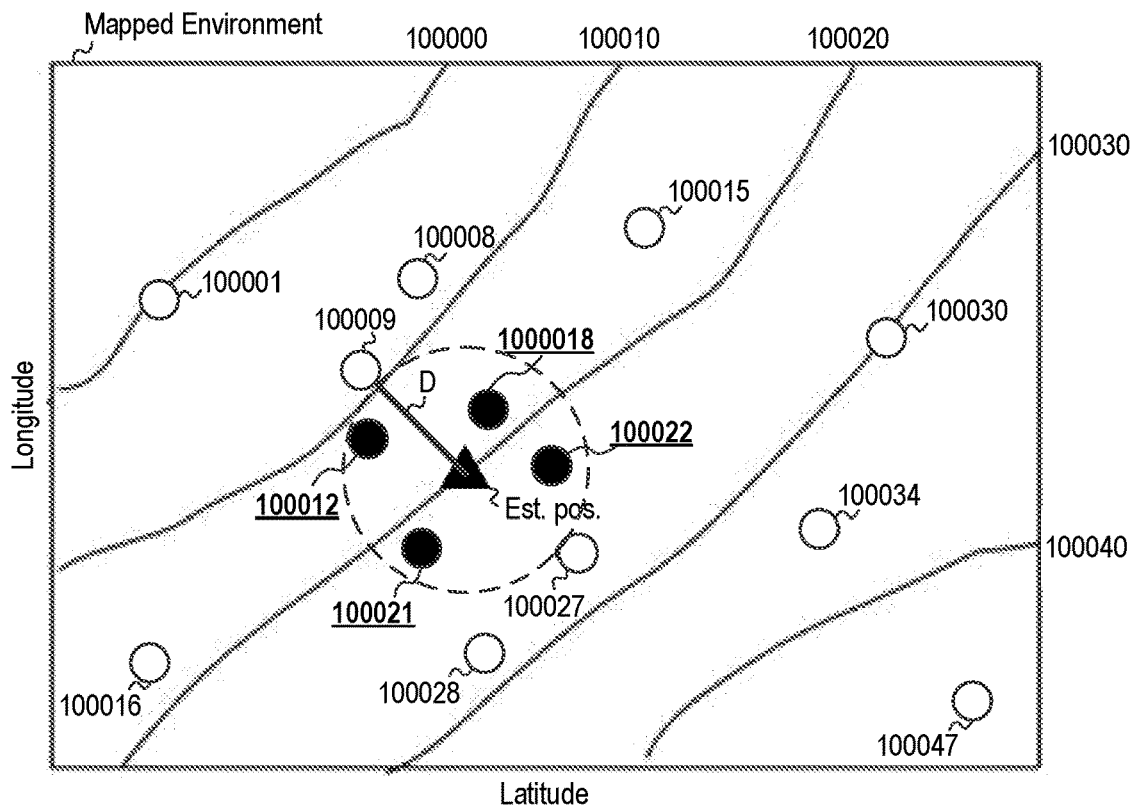

FIG. 3A illustrates an initial estimated position of a mobile device (shown as a black triangle) determined in step 210, and positions of weather stations (shown as circles) at which sample measurements of pressure (shown as numbers connected to the circles) were determined during step 220. Measurements of temperature (not shown) may also be determined at the different positions of the weather stations. For purposes of illustration, the positions the weather stations and the initial estimated position are shown to be two-dimensional (e.g., in terms of latitude and longitude). These positions could alternatively be represented in three-dimensions. FIG. 3B illustrates sample reference-level pressures at a reference-level altitude determined in step 230 based on the sample measurements of pressure from step 220. FIG. 3C illustrates sample isobars determined from a spatial distribution of the reference-level pressures during step 240. The value of each isobar is provided (e.g., 100000 through 100040). The isobars include a "first isobar" that passes through the initial estimated position. FIG. 3D illustrates a point (shown as a black square) on a "second isobar" that is to the initial estimated position determined during step 250. FIG. 3E illustrates a distance D separating the closet point and the initial estimated position of the mobile device that is determined during step 260. FIG. 3F illustrates each location (shown as a black circle) of each reference-level pressure (e.g., shown as an underlined number) that has a position that is no more than the distance D away from the initial estimated position (e.g., in two dimensions), as identified during step 270. As shown, four locations are within the distance D form the initial estimated position.

FIG. 4 depicts another process for determining which reference-level pressures, from among a plurality of available reference-level pressures, are used when estimating an altitude of a mobile device. As shown, the process of FIG. 4 includes the steps of: performing steps 210 through 240 of FIG. 2; identifying each weather station that is located between the first isobar and a second isobar that neighbors the first isobar (step 450); identifying each reference-level pressure for each identified weather station (step 460); and using the identified reference-level pressures to estimate the altitude of the mobile device (step 470). In different embodiments, steps 450, 460 and 470 are performed using a processor of the mobile device, a server, or another suitable machine (while the remaining steps incorporated from other processes are performed using machines previously-designated for those steps).

As shown in FIG. 4, one embodiment of step 450 identifies the second isobar as any isobar that neighbors the first isobar. Another embodiment of step 450 comprises the steps of: (i) determining that a point on the second isobar is closer to the initial estimated position than any other point on any isobar from the plurality of isobars other than the first isobar (sub-step 450a); (ii) selecting the second isobar because the point on the second isobar is closer to the initial estimated position than any other point on any isobar from the plurality of isobars other than the first isobar (sub-step 450b); and (iii) identifying each weather station that is located between the first isobar and the second isobar (sub-step 450c). Identification during sub-step 450c may be performed using different techniques. One technique is determining an area between the isobars, and then searching for all positions of weather stations inside that area. Embodiments of step 470 include embodiments specified elsewhere herein for step 280. One embodiment of FIG. 4 includes an additional step before step 460 that comprises: identifying each weather station that is located between the first isobar and a third isobar that neighbors the first isobar.

Step 450 through step 470 provide one embodiment for using a plurality of isobars to estimate the altitude of the mobile device.

One advantage of the process depicted in FIG. 4 includes use of selected reference-level pressures that are closest to the expected reference-level pressure for the initial estimated position even though the locations of the selected reference-level pressures may be further away from the initial estimated position compared to locations of other reference-level pressures (e.g., the pressure values of 100009 and 100008). Use of reference-level pressures between the first isobar and a neighboring isobar will yield more accurate estimates of altitudes compared to use of reference-level pressures on the opposite side of the neighboring isobar relative to the first isobar (e.g., the pressure values of 100009 and 100008).

By way of example, FIG. 5A through FIG. 5D show another mapped environment at different steps of the process of FIG. 4.

Figure 5A:
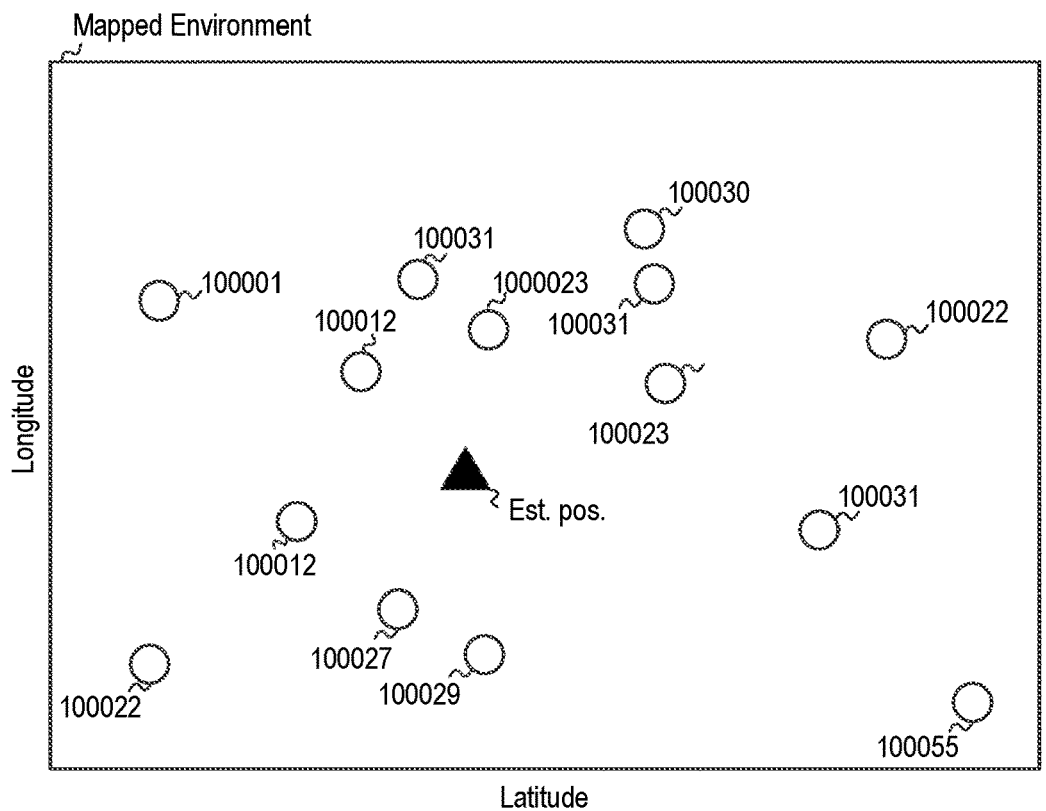
FIG. 5A through FIG. 5D show a mapped environment at different steps of the process of FIG. 4.
Figure 5B:
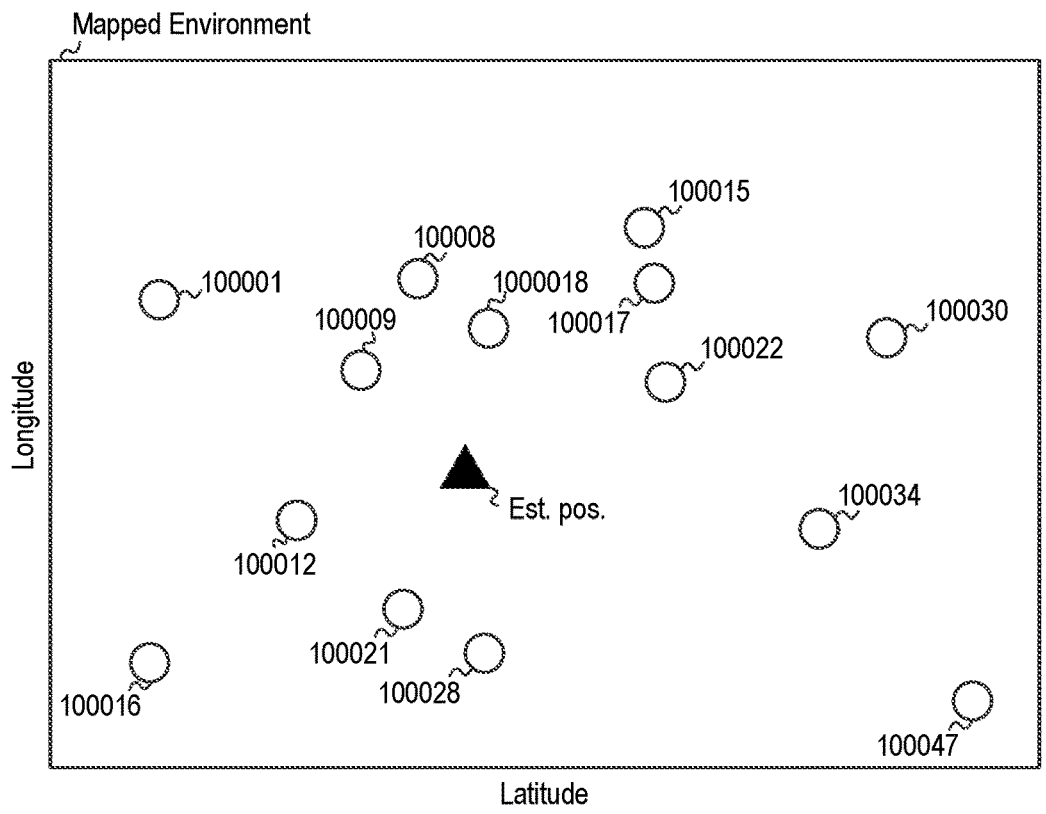
Figure 5C:
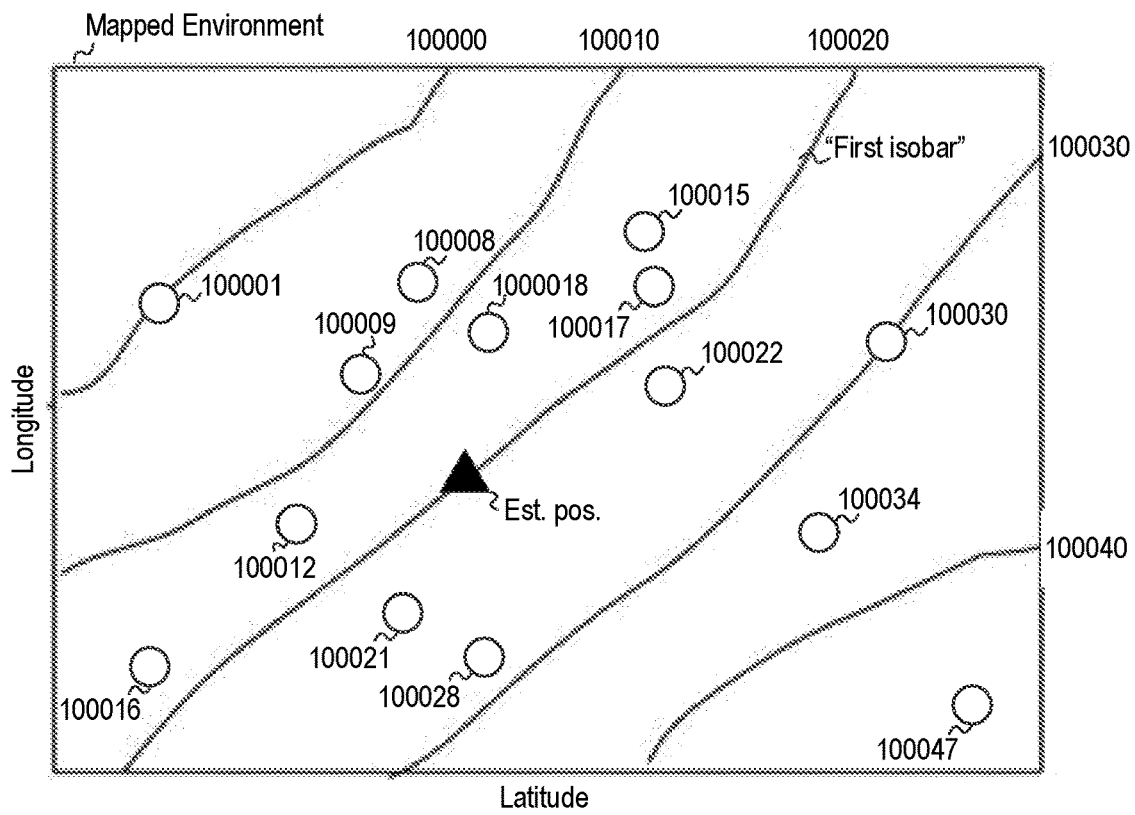
Figure 5D:
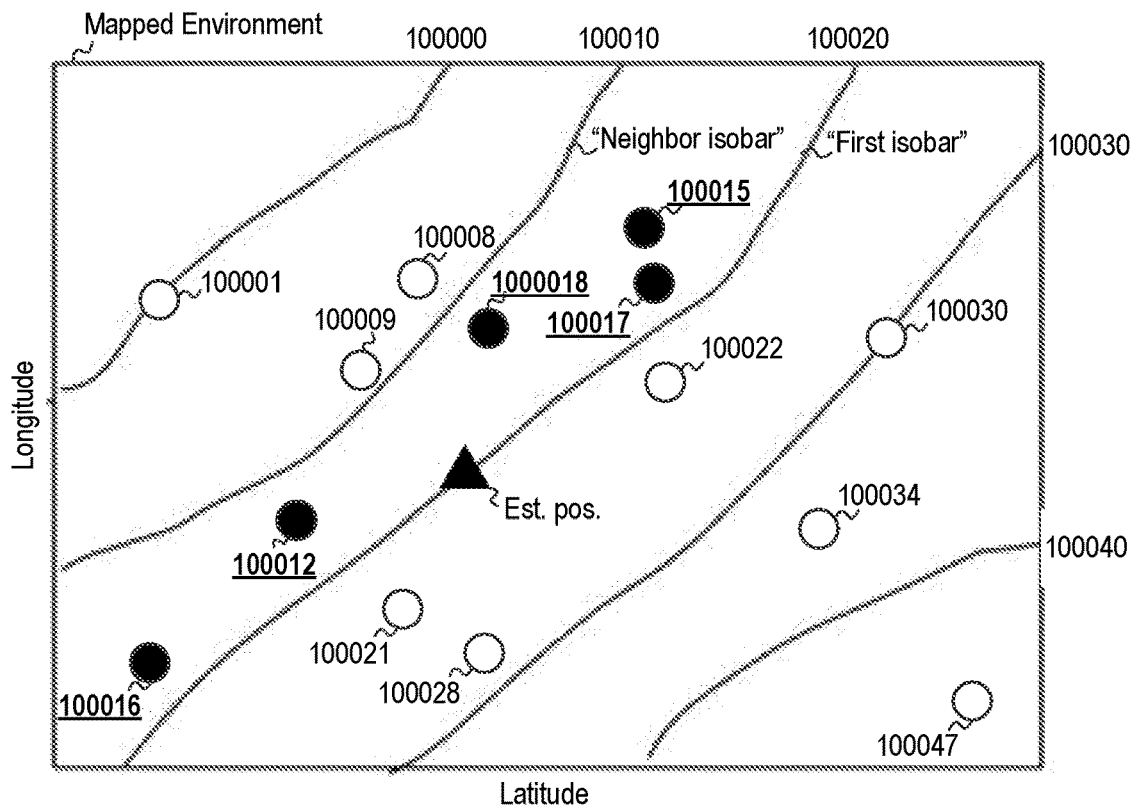

FIG. 5A illustrates an initial estimated position of a mobile device (shown as a black triangle) determined in step 210, and positions of weather stations (shown as circles) at which sample measurements of pressure (shown as numbers connected to the circles) were determined during step 220. Measurements of temperature (not shown) may also be determined at the different positions of the weather stations. For purposes of illustration, the positions the weather stations and the initial estimated position are shown to be two-dimensional (e.g., in terms of latitude and longitude). These positions could alternatively be represented in three-dimensions. FIG. 5B illustrates sample reference-level pressures at a reference-level altitude determined in step 230 based on the sample measurements of pressure from step 220. FIG. 5C illustrates sample isobars determined from a spatial distribution of the reference-level pressures during step 240. The value of each isobar is provided (e.g., 100000 through 100040). The isobars include a "first isobar" that passes through the initial estimated position. FIG. 5D illustrates each reference-level pressure for each weather station positioned between two isobars (shown by black circles) identified during steps 450 and 460. The two isobars include the first isobar and an isobar that neighbors the first isobar.

Figure 6A:
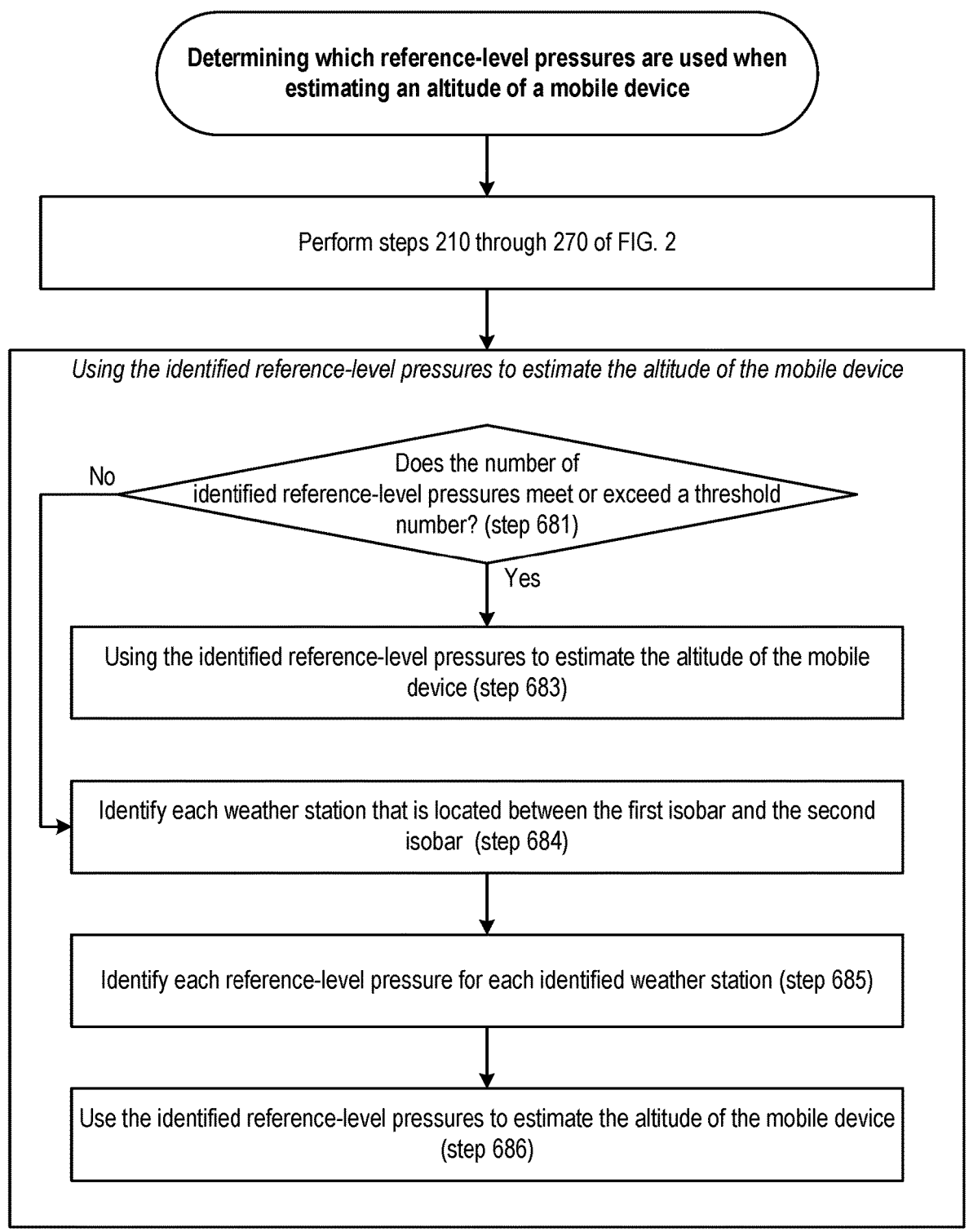
FIG. 6A through FIG. 6C each depict a process for determining which reference-level pressures, from among a plurality of available reference-level pressures, are used when estimating an altitude of a mobile device.
Figure 6B:
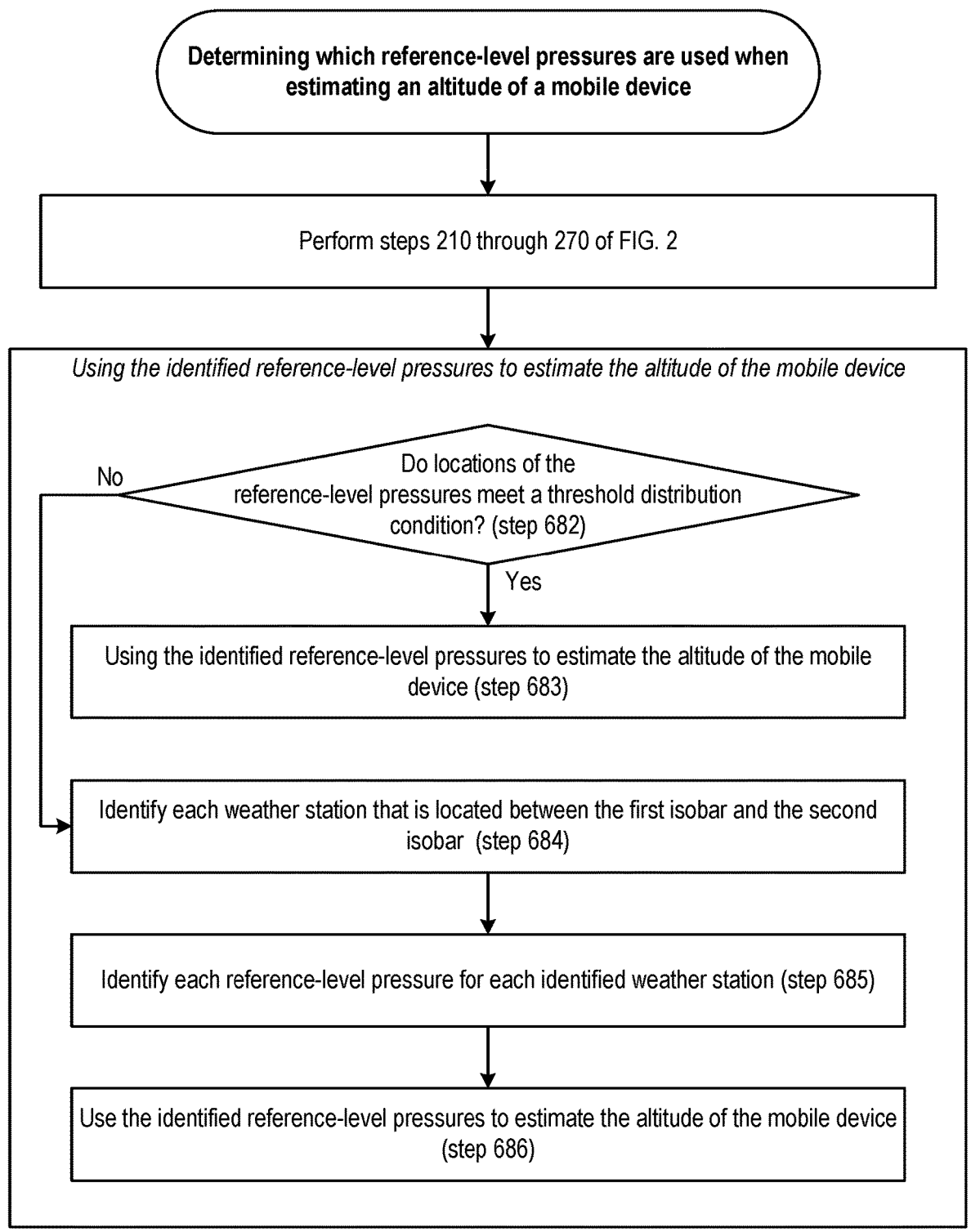
Figure 6C:
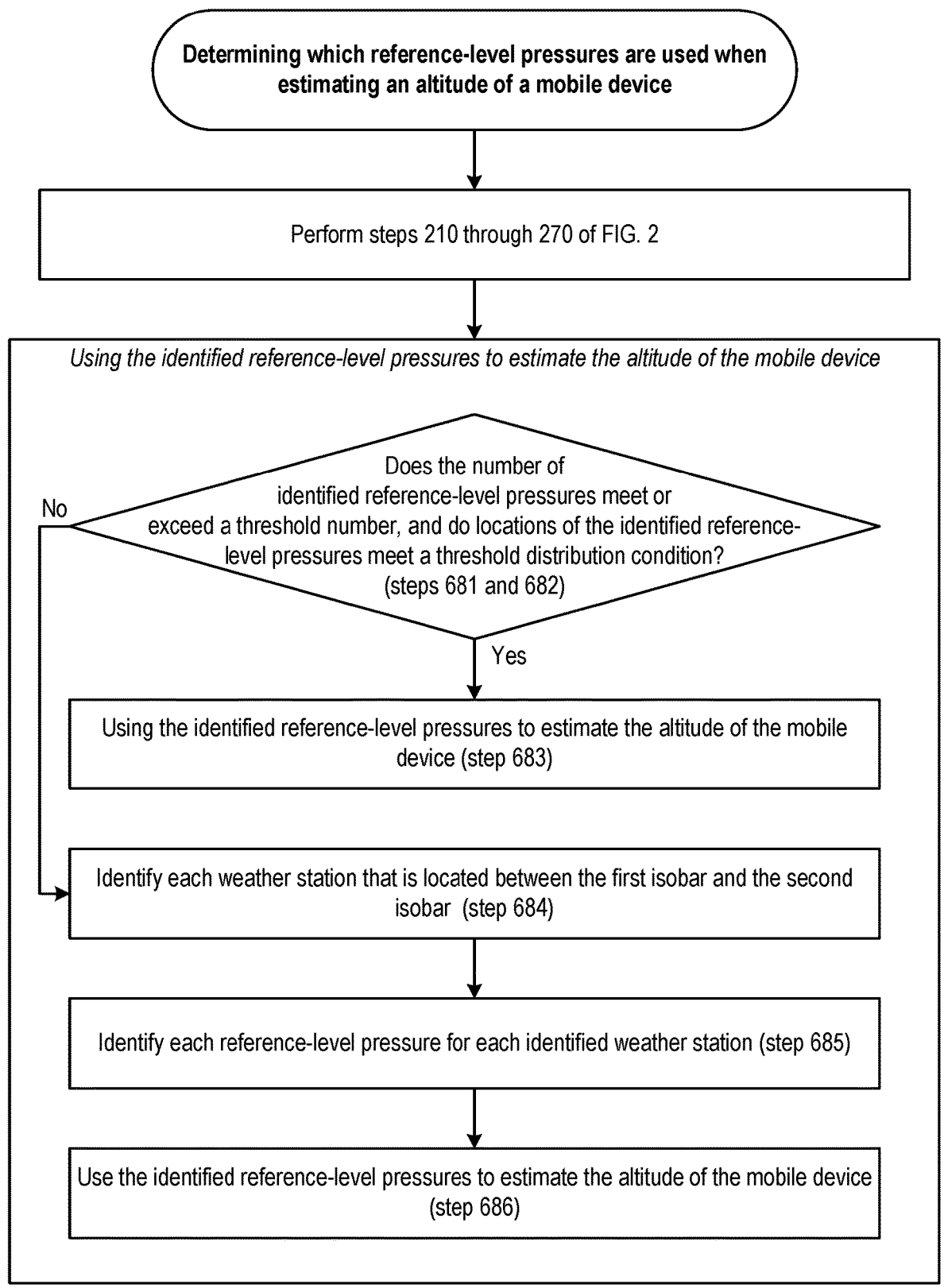

FIG. 6A through FIG. 6C each depict processes for determining which reference-level pressures, from among a plurality of available reference-level pressures, are used when estimating an altitude of a mobile device.

The process of FIG. 6A includes the steps of: performing steps 210 through 270 of FIG. 2; determining if the number of identified reference-level pressures meets or exceeds a threshold number (e.g., at least one, two, three, or another predetermined number) (step 681); if the number of identified reference-level pressures meets or exceeds the threshold number, using the identified reference-level pressures to estimate the altitude of the mobile device (step 683); and if the number of identified reference-level pressures does not meet or exceed the threshold number, identifying each weather station that is located between the first isobar and the second isobar (step 684), identifying each reference-level pressure for each identified weather station (step 685), and using the identified reference-level pressures to estimate the altitude of the mobile device (step 686). In a preferred embodiment of step 681, the threshold number is at least three, since having at least three reference-level pressures that can be mathematically combined (e.g., averaged) produces a singular reference-level pressure that is believed to be more reflective of true reference-level pressure at the latitude and longitude of the mobile device. Using at least three reference-level pressures as the threshold number also accounts for the possibility that one of the identified reference-level pressures can occasionally be inaccurate due to localized pressurization at the location of that reference-level pressure, and reduces the effect of any inaccuracy introduced by that localized pressurization using a combination of multiple reference-level pressures.

The process of FIG. 6B includes the steps of: performing steps 210 through 270 of FIG. 2; determining if locations of the reference-level pressures relative to the initial estimated position of the mobile device meet a threshold distribution condition (step 682); if locations of the reference-level pressures relative to the initial estimated position of the mobile device meet the threshold distribution condition, using the identified reference-level pressures to estimate the altitude of the mobile device (step 683); and if locations of the reference-level pressures relative to the initial estimated position of the mobile device do not meet the threshold distribution condition, identifying each weather station that is located between the first isobar and the second isobar (step 684), identifying each reference-level pressure for each identified weather station (step 685), and using the identified reference-level pressures to estimate the altitude of the mobile device (step 686).

The process of FIG. 6C includes the steps of: performing steps 210 through 270 of FIG. 2; determining if the number of identified reference-level pressures meets or exceeds a threshold number (step 681) and determining if locations of the reference-level pressures relative to the initial estimated position of the mobile device meet a threshold distribution condition (step 682); if the number of identified reference-level pressures meets or exceeds the threshold number, and if locations of the reference-level pressures relative to the initial estimated position of the mobile device meet the threshold distribution condition, using the identified reference-level pressures to estimate the altitude of the mobile device (step 683); and if the number of identified reference-level pressures does not meet or exceed the threshold number, or if locations of the reference-level pressures relative to the initial estimated position of the mobile device do not meet the threshold distribution condition, identifying each weather station that is located between the first isobar and the second isobar (step 684), identifying each reference-level pressure for each identified weather station (step 685), and using the identified reference-level pressures to estimate the altitude of the mobile device (step 686).

In general, the threshold distribution condition of step 682 requires locations of reference-level pressures that surround the initial estimated position of the mobile device (e.g., locations of reference-level pressures in different directions from the initial estimated position of the mobile device). In one embodiment of step 682, the threshold distribution condition requires that each of a plurality of directional areas around the initial estimated position of the mobile device include at least one location of a reference-level pressure from the locations of the reference-level pressures, where the directional areas have the same size (e.g., a range of azimuth angles having a size of 90° or other dimension). In another embodiment of step 682, the threshold distribution condition requires that at least one location of a reference-level pressure from the locations of the reference-level pressures is found in each of four different directions (e.g., east, west, north and south, or another set of directions). Different numbers of directions can be used in different embodiments.

In different embodiments of FIG. 6A through FIG. 6C, step 681 through step 686 are performed using a processor of the mobile device, a server, or another suitable machine. Embodiments of step 280 from FIG. 2 may be used to perform step 683. Embodiments of steps 450 through 470 of FIG. 4 may be used to perform steps 684 through 686, respectively.

Figure 7A:
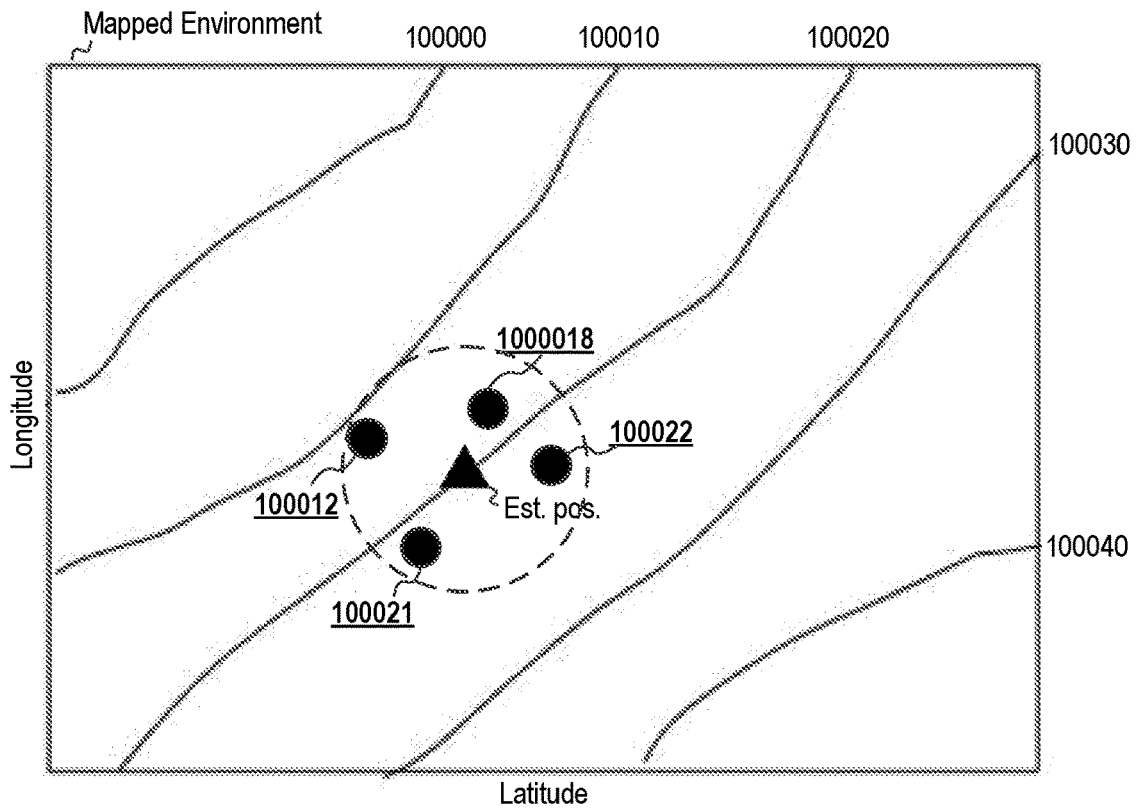
FIG. 7A and FIG. 7B show a mapped environment at different steps of the processes of FIG. 6A through FIG. 6C.
Figure 7B:
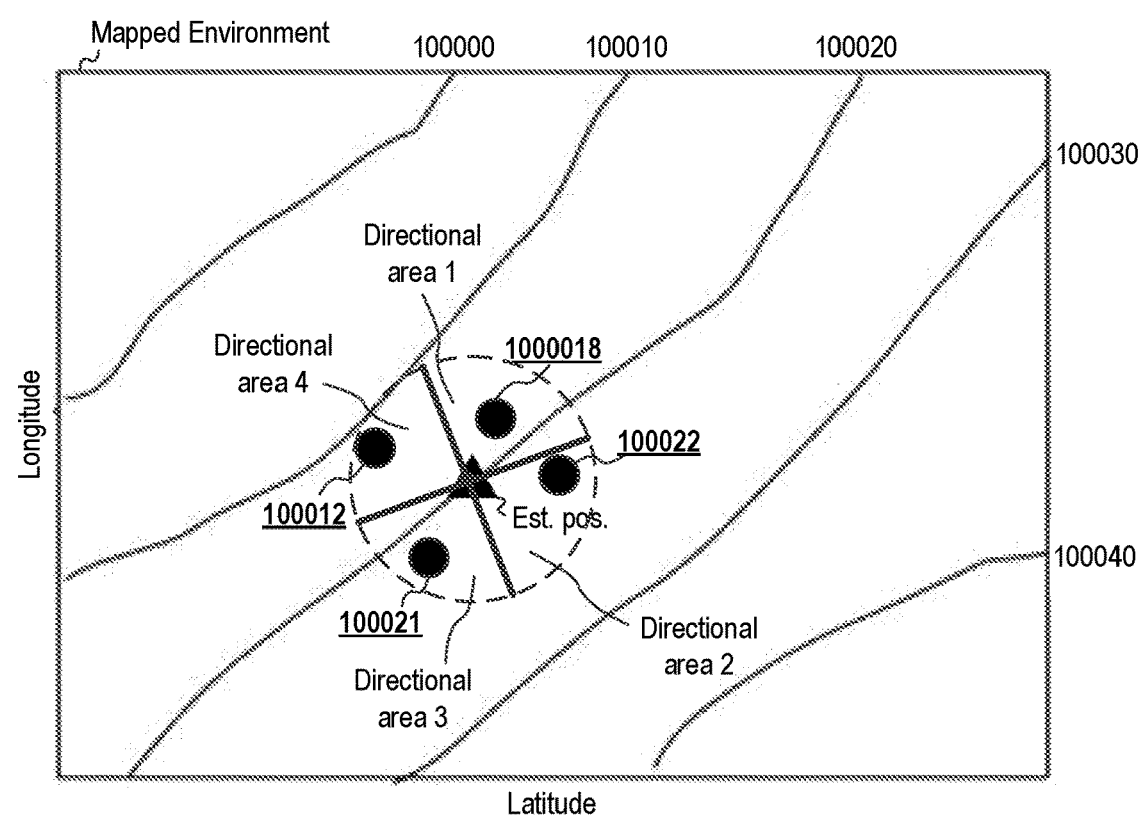

By way of example, FIG. 7A and FIG. 7B show a mapped environment illustrating different scenarios for process of FIG. 6.

FIG. 7A illustrates circumstances when the number of reference-level pressures (e.g., 4) meet or exceed a threshold number (e.g., 3 or 4 depending on implementation) during step 610. FIG. 7B illustrates circumstances when the locations of the reference-level pressures meet a threshold distribution condition (e.g., at least one reference-level pressure in each of four directional areas) during step 615.

Technical Benefits

Mobile devices are routinely used to estimate positions of their users in different environments. Examples of estimated positions include estimated altitudes of mobile devices that are based on (i) reference pressures from a network of reference pressure sensors and (ii) measurements of pressure from pressure sensors of the mobile devices. Processes described herein improve the field of position determination by improving how an altitude of a mobile device is estimated. In particular, reference-level pressures needed to estimate an altitude of a mobile device are identified without reliance on using predefined distances that are not customized to atmospheric characteristics (e.g., pressure variation) in an environment. Optimal selection of reference-level pressures can be achieved by considering atmospheric characteristics (e.g., pressure variation) in an environment. The optimal selection of reference-level pressures enables more accurate and more reliable estimated altitudes of mobile devices, which in turn provide for quicker emergency response times or otherwise improve the usefulness of estimated positions. Also, in some embodiments the optimal selection of reference-level pressures improves the functioning of processors and batteries by reducing use of valuable processing and battery resources through decreasing the number of identified reference-level pressures from all reference-level pressures within a predefined distance to a lesser number of reference-level pressures within a smaller distance that is determined based on an understanding of atmospheric characteristics in an environment.

Other Aspects

In different embodiments, dentification of a thing (e.g., a weather station, a reference-level pressure) includes identifying the thing from among other things or otherwise determining the thing.

Any method (also referred to as a "process" or an "approach") described or otherwise enabled by disclosure herein may be implemented by hardware components (e.g., machines), software modules (e.g., stored in machine-readable media), or a combination thereof. By way of example, machines may include one or more computing device(s), processor(s), controller(s), integrated circuit(s), chip(s), system(s) on a chip, server(s), programmable logic device(s), field programmable gate array(s), electronic device(s), special purpose circuitry, and/or other suitable device(s) described herein or otherwise known in the art. One or more non-transitory machine-readable media embodying program instructions that, when executed by one or more machines, cause the one or more machines to perform or implement operations comprising the steps of any of the methods described herein are contemplated herein. As used herein, machine-readable media includes all forms of machine-readable media (e.g. one or more non-volatile or volatile storage media, removable or non-removable media, integrated circuit media, magnetic storage media, optical storage media, or any other storage media, including RAM, ROM, and EEPROM) that may be patented under the laws of the jurisdiction in which this application is filed, but does not include machine-readable media that cannot be patented under the laws of the jurisdiction in which this application is filed. Systems that include one or more machines and one or more non-transitory machine-readable media are also contemplated herein. One or more machines that perform or implement, or are configured, operable or adapted to perform or implement operations comprising the steps of any methods described herein are also contemplated herein. Method steps described herein may be order independent and can be performed in parallel or in an order different from that described if possible to do so. Different method steps described herein can be combined to form any number of methods, as would be understood by one of ordinary skill in the art. Any method step or feature disclosed herein may be omitted from a claim for any reason. Certain well-known structures and devices are not shown in figures to avoid obscuring the concepts of the present disclosure. When two things are "coupled to" each other, those two things may be directly connected together, or separated by one or more intervening things. Where no lines or intervening things connect two particular things, coupling of those things is contemplated in at least one embodiment unless otherwise stated. Where an output of one thing and an input of another thing are coupled to each other, information sent from the output is received in its outputted form or a modified version thereof by the input even if the information passes through one or more intermediate things. Any known communication pathways and protocols may be used to transmit information (e.g., data, commands, signals, bits, symbols, chips, and the like) disclosed herein unless otherwise stated. The words comprise, comprising, include, including and the like are to be construed in an inclusive sense (i.e., not limited to) as opposed to an exclusive sense (i.e., consisting only of). Words using the singular or plural number also include the plural or singular number, respectively, unless otherwise stated. The word "or" and the word "and" as used in the Detailed Description cover any of the items and all of the items in a list unless otherwise stated. The words some, any and at least one refer to one or more. The terms may or can are used herein to indicate an example, not a requirement— e.g., a thing that may or can perform an operation, or may or can have a characteristic, need not perform that operation or have that characteristic in each embodiment, but that thing performs that operation or has that characteristic in at least one embodiment. Unless an alternative approach is described, access to data from a source of data may be achieved using known techniques (e.g., requesting component requests the data from the source via a query or other known approach, the source searches for and locates the data, and the source collects and transmits the data to the requesting component, or other known techniques).

Figure 8:
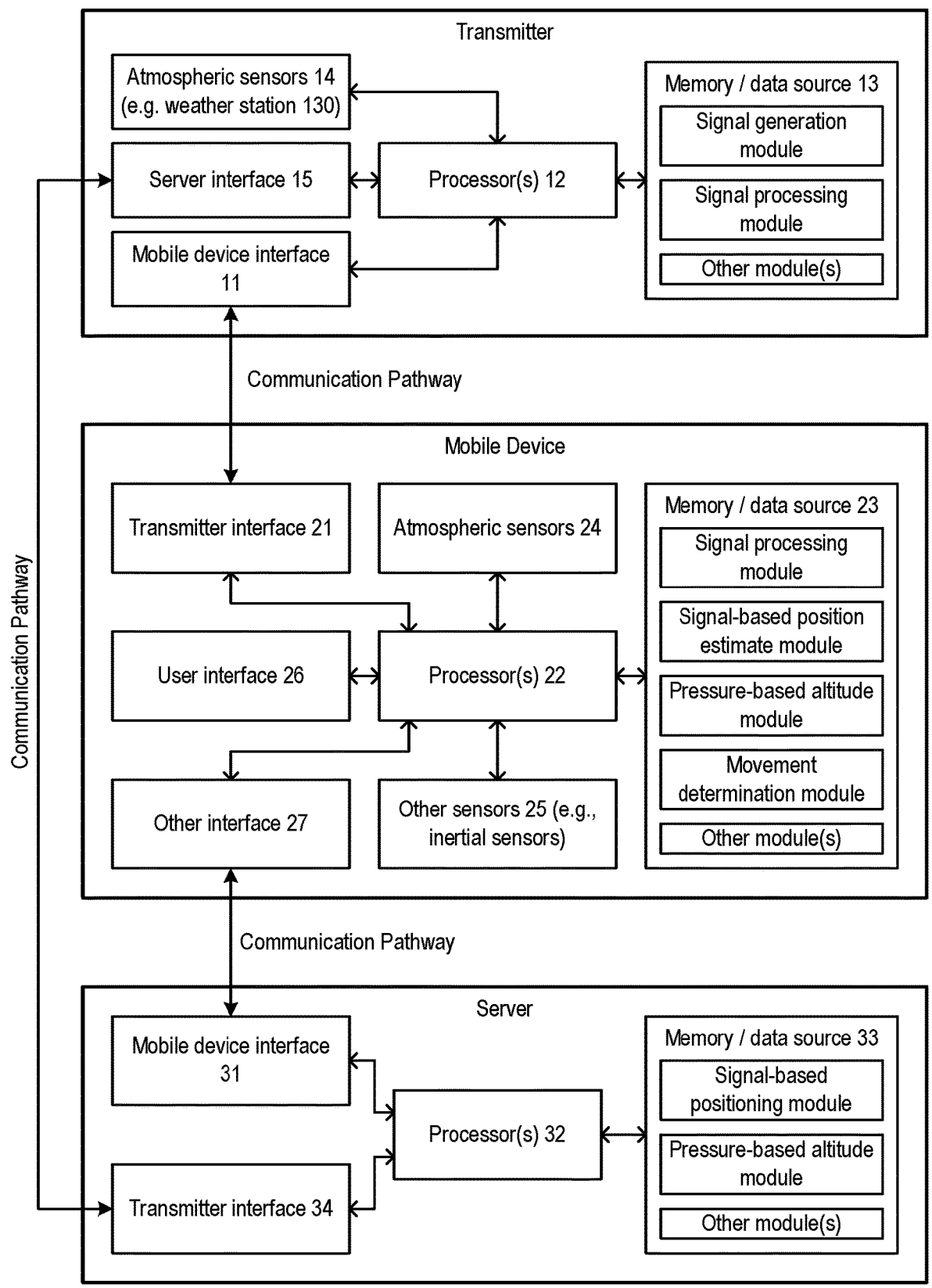
FIG. 8 illustrates components of a transmitter, a mobile device, and a server.

FIG. 8 illustrates components of a transmitter, a mobile device, and a server. Examples of communication pathways are shown by arrows between components.

By way of example in FIG. 8, each of the transmitters may include: a mobile device interface 11 for exchanging information with a mobile device (e.g., an antenna and RF front end components known in the art or otherwise disclosed herein); one or more processor(s) 12; memory/data source 13 for providing storage and retrieval of information and/or program instructions; atmospheric sensor(s) 14 for measuring environmental conditions (e.g., pressure, temperature, other) at or near the transmitter; a server interface 15 for exchanging information with a server (e.g., an antenna, a network interface, or other); and any other components known to one of ordinary skill in the art. The memory/data source 13 may include memory storing software modules with executable instructions, and the processor(s) 12 may perform different actions by executing the instructions from the modules, including: (i) performance of part or all of the methods as described herein or otherwise understood by one of skill in the art as being performable at the transmitter; (ii) generation of positioning signals for transmission using a selected time, frequency, code, and/or phase; (iii) processing of signaling received from the mobile device or other source; or (iv) other processing as required by operations described in this disclosure. Signals generated and transmitted by a transmitter may carry different information that, once determined by a mobile device or a server, may identify the following: the transmitter; the transmitter's position; environmental conditions at or near the transmitter; and/or other information known in the art. The atmospheric sensor(s) 14 may be integral with the transmitter, or separate from the transmitter and either co-located with the transmitter or located in the vicinity of the transmitter (e.g., within a threshold amount of distance).

In some embodiments, the atmospheric sensors 14 include a weather station. In other embodiments, a stand-alone weather station is substituted for the transmitter, and the stand-alone weather station includes: atmospheric sensors (e.g., a pressure sensor for measuring pressures, a temperature sensor for measuring temperatures); memory (e.g., storing instructions for computing reference-level pressures based on the measured pressures); processor(s) for executing instructions stored in the memory; and any suitable interface for communicating pressure data to other things (e.g., the mobile device and/or the server).

By way of example FIG. 8, the mobile device may include: a transmitter interface 21 for exchanging information with a transmitter (e.g., an antenna and RF front end components known in the art or otherwise disclosed herein); one or more processor(s) 22; memory/data source 23 for providing storage and retrieval of information and/or program instructions; atmospheric sensor(s) 24 for measuring environmental conditions (e.g., pressure, temperature, other) at the mobile device; other sensor(s) 25 for measuring other conditions (e.g., inertial sensors for measuring movement and orientation); a user interface 26 (e.g., display, keyboard, microphone, speaker, other) for permitting a user to provide inputs and receive outputs; another interface 27 for exchanging information with the server or other devices external to the mobile device (e.g., an antenna, a network interface, or other); and any other components known to one of ordinary skill in the art. A GNSS interface and processing unit (not shown) are contemplated, which may be integrated with other components (e.g., the interface 21 and the processors 22) or a standalone antenna, RF front end, and processors dedicated to receiving and processing GNSS signaling. The memory/data source 23 may include memory storing software modules with executable instructions, and the processor(s) 22 may perform different actions by executing the instructions from the modules, including: (i) performance of part or all of the methods as described herein or otherwise understood by one of ordinary skill in the art as being performable at the mobile device; (ii) estimation of an altitude of the mobile device based on measurements of pressure form the mobile device and transmitter(s), temperature measurement(s) from the transmitter(s) or another source, and any other information needed for the computation); (iii) processing of received signals to determine position information (e.g., times of arrival or travel time of the signals, pseudoranges between the mobile device and transmitters, transmitter atmospheric conditions, transmitter and/ or locations or other transmitter information); (iv) use of position information to compute an estimated position of the mobile device; (v) determination of movement based on measurements from inertial sensors of the mobile device; (vi) GNSS signal processing; or (vii) other processing as required by operations described in this disclosure.

By way of example FIG. 8, the server may include: a mobile device interface 21 for exchanging information with a mobile device (e.g., an antenna, a network interface, or other); one or more processor(s) 32; memory/data source 33 for providing storage and retrieval of information and/or program instructions; a transmitter interface 34 for exchanging information with a transmitter (e.g., an antenna, a network interface, or other); and any other components known to one of ordinary skill in the art. The memory/data source 33 may include memory storing software modules with executable instructions, and the processor(s) 32 may perform different actions by executing instructions from the modules, including: (i) performance of part or all of the methods as described herein or otherwise understood by one of ordinary skill in the art as being performable at the server; (ii) estimation of an altitude of the mobile device; (iii) computation of an estimated position of the mobile device; or (iv) other processing as required by operations described in this disclosure. Steps performed by servers as described herein may also be performed on other machines that are remote from a mobile device, including computers of enterprises or any other suitable machine.

Systems and methods disclosed herein may operate within a network of terrestrial transmitters or satellites. The transmitters may be located at different altitudes or depths that are inside or outside various natural or manmade structures (e.g. buildings). Positioning signals may be sent to the mobile device from the transmitters and/or satellites using known wireless or wired transmission technologies. The transmitters may transmit the signals using one or more common multiplexing parameters—e.g. time slot, pseudorandom sequence, frequency offset, or other. The mobile device may take different forms, including a mobile phone, a tablet, a laptop, a tracking tag, a receiver, or another suitable device that can receive the positioning signals. Certain aspects disclosed herein relate to positioning modules that estimate the positions of mobile devices—e.g., where the position is represented in terms of: latitude, longitude, and/or altitude coordinates; x, y, and/or z coordinates; angular coordinates; or other representations. Positioning modules use various techniques to estimate the position of a mobile device, including trilateration, which is the process of using geometry to estimate the position of a mobile device using distances traveled by different "positioning" (or "ranging") signals that are received by the mobile device from different beacons (e.g., terrestrial transmitters and/or satellites). If position information like the transmission time and reception time of a positioning signal from a beacon are known, then the difference between those times multiplied by speed of light would provide an estimate of the distance traveled by that positioning signal from that beacon to the mobile device. Different estimated distances corresponding to different positioning signals from different beacons can be used along with position information like the locations of those beacons to estimate the position of the mobile device. Positioning systems and methods that estimate a position of a mobile device (in terms of latitude, longitude and/or altitude) based on positioning signals from beacons (e.g., transmitters, and/or satellites) and/or atmospheric measurements are described in co-assigned U.S. Pat. No. 8,130,141, issued Mar. 6, 2012, and U.S. Patent Application Publication No. US 2012/0182180, published Jul. 19, 2012. It is noted that the term "positioning system" may refer to satellite systems (e.g., Global Navigation Satellite Systems (GNSS) like GPS, GLONASS, Galileo, and Compass/Beidou), terrestrial systems, and hybrid satellite/terrestrial systems.

This application relates to the following related application(s): U.S. Pat. Appl. No. 62/680,059, filed 4 Jun. 2018, entitled SYSTEMS AND METHODS FOR DETERMINING WHICH REFERENCE-LEVEL PRESSURES ARE USED WHEN ESTIMATING AN ALTITUDE OF A MOBILE DEVICE. The content of each of the related application(s) is hereby incorporated by reference herein in its entirety.

The invention claimed is:

1. A method for determining which reference-level pressures, from among a plurality of available reference-level pressures, are used when estimating an altitude of a mobile device, the method comprising:
   determining an initial estimated position of a mobile device;
   for each weather station from a plurality of weather stations, determining a measurement of a pressure at a location of that weather station;
   for each weather station from the plurality of weather stations, converting the measurement of the pressure of that weather station to a reference-level pressure of a reference-level altitude;
   determining a plurality of isobars from the reference-level pressures,
   wherein the plurality of isobars include a first isobar on which the initial estimated position is located;
   wherein each pair of neighboring isobars from the plurality of isobars are separated by no more than a predefined amount of pressure, the predefined amount of pressure being selected based on a tolerated altitude error for estimating the altitude of the mobile device; and
   using the plurality of isobars to estimate the altitude of the mobile device.

2. The method of claim 1, wherein each pair of neighboring isobars from the plurality of isobars are separated by exactly the predefined amount of pressure.

3. The method of claim 1, wherein using the plurality of isobars to estimate the altitude of the mobile device comprises:
   determining a point on a second isobar that is closer to the initial estimated position of the mobile device than any other point on any isobar from the plurality of isobars other than the first isobar on which the initial estimated position is located;
   determining a distance between the point on the second isobar and the initial estimated position of the mobile device;
   identifying each reference-level pressure for each weather station from the plurality of weather stations that has a position that is within the distance away from the initial estimated position; and
   using the identified reference-level pressures to estimate the altitude of the mobile device.

4. The method of claim 3, wherein using the identified reference-level pressures to estimate the altitude of the mobile device comprises:
   determining if the number of identified reference-level pressures meets or exceeds a threshold number;
   if the number of identified reference-level pressures meets or exceeds the threshold number, using the identified reference-level pressures to estimate the altitude of the mobile device; and
   if the number of identified reference-level pressures does not meet or exceed the threshold number:
      (a) identifying each weather station from the plurality of weather stations that is located between the first isobar and the second isobar;
      (b) identifying each reference-level pressure for each of the identified weather stations that are located between the first isobar and the second isobar; and
      (c) using the identified reference-level pressures for each of the identified weather stations that are located between the first isobar and the second isobar to estimate the altitude of the mobile device.

5. The method of claim 4, wherein the threshold number is at least three.

6. The method of claim 3, wherein using the identified reference-level pressures to estimate the altitude of the mobile device comprises:
   determining if locations of the identified reference-level pressures relative to the initial estimated position of the mobile device meet a threshold distribution condition;
   if locations of the identified reference-level pressures meet the threshold distribution condition, using the identified reference-level pressures to estimate the altitude of the mobile device; and
   if locations of the identified reference-level pressures relative to the initial estimated position of the mobile device do not meet the threshold distribution condition:
      (a) identifying each weather station from the plurality of weather stations that is located between the first isobar and the second isobar that neighbors the first isobar;
      (b) identifying each reference-level pressure for each of the identified weather stations that are located between the first isobar and the second isobar; and
      (c) using the identified reference-level pressures for each of the identified weather stations that are located between the first isobar and the second isobar to estimate the altitude of the mobile device.

7. The method of claim 6, wherein locations of the identified reference-level pressures meet the threshold distribution condition when each of a plurality of directional areas around the initial estimated position of the mobile device include at least one location of a reference-level pressure from the locations of the identified reference-level pressures, and locations of the identified reference-level pressures do not meet the threshold distribution condition when at least one of the plurality of directional areas around the initial estimated position of the mobile device does not include at least one location of a reference-level pressure from the locations of the identified reference-level pressures.

8. The method of claim 7, wherein the plurality of directional areas include at least four directional areas.

9. The method of claim 8, wherein each directional area of the plurality of directional areas are the same size.

10. The method of claim 3, wherein using the identified reference-level pressures to estimate the altitude of the mobile device comprises:

determining if the number of identified reference-level pressures meets or exceeds a threshold number and if locations of the identified reference-level pressures relative to the initial estimated position of the mobile device meet a threshold distribution condition;

if the number of identified reference-level pressures meets or exceeds the threshold number, and if locations of the identified reference-level pressures meet the threshold distribution condition, using the identified reference-level pressures to estimate the altitude of the mobile device; and if the number of identified reference-level pressures does not meet or exceed the threshold number, or if locations of the identified reference-level pressures relative to the initial estimated position of the mobile device do not meet the threshold distribution condition:

(a) identifying each weather station from the plurality of weather stations that is located between the first isobar and a second isobar that neighbors the first isobar;

(b) identifying each reference-level pressure for each of the identified weather stations that are located between the first isobar and the second isobar; and (c) using the identified reference-level pressures for each of the identified weather stations that are located between the first isobar and the second isobar to estimate the altitude of the mobile device.

11. The method of claim 1, wherein using the plurality of isobars to estimate the altitude of the mobile device comprises:

identifying each weather station from the plurality of weather stations that is located between the first isobar and a second isobar that neighbors the first isobar;

identifying each reference-level pressure for each identified weather station; and using the identified reference-level pressures to estimate the altitude of the mobile device.

12. The method of claim 11, wherein identifying each weather station from the plurality of weather stations that is located between the first isobar and the second isobar that neighbors the first isobar comprises:

determining that a point on the second isobar is closer to the initial estimated position than any other point on any isobar from the plurality of isobars other than the first isobar;

selecting the second isobar because the point on the second isobar is closer to the initial estimated position than any other point on any isobar from the plurality of isobars other than the first isobar; and identifying each weather station from the plurality of weather stations that is located between the first isobar and the second isobar.

13. One or more non-transitory machine-readable media embodying program instructions that, when executed by one or more machines, cause the one or more machines to implement the method of claim 1.

14. A system for determining which reference-level pressures, the system comprising: a memory comprising computer-executable instructions; and a machine configured to execute the computer-executable instructions and cause the system to perform the method of claim 1.

* * * * *